US007744033B2

(12) United States Patent
Gonzalez Liñero (10) Patent No.: US 7,744,033 B2
(45) Date of Patent: Jun. 29, 2010

(54) AIRCRAFT LUGGAGE HANDLING SYSTEM

(75) Inventor: Luis Gonzalez Liñero, Bristol (GB)

(73) Assignee: Airbus Operations Limited, Bristol (GB)

( * ) Notice: Subject to any disclaimer, the term of this patent is extended or adjusted under 35 U.S.C. 154(b) by 509 days.

(21) Appl. No.: 11/798,827

(22) Filed: May 17, 2007

(65) Prior Publication Data

US 2007/0284481 A1 Dec. 13, 2007

(30) Foreign Application Priority Data

May 18, 2006 (GB) ................................. 0609891.7

(51) Int. Cl.
*B64C 1/20* (2006.01)
(52) U.S. Cl. .............. 244/118.1; 244/118.5; 244/137.1; 244/137.2; 244/118.6
(58) Field of Classification Search ............. 244/118.1, 244/118.5, 118.6, 137.1, 137.2
See application file for complete search history.

(56) References Cited

U.S. PATENT DOCUMENTS

| | | | |
|---|---|---|---|
| 3,522,919 A | 8/1970 | Bader | |
| 4,635,883 A | 1/1987 | Hamilton et al. | |
| 5,014,935 A | 5/1991 | Dalbera | |
| 6,340,136 B1 * | 1/2002 | Luria | 244/118.1 |
| 6,663,043 B1 * | 12/2003 | Luria | 244/118.1 |
| 6,971,608 B2 * | 12/2005 | Harrington et al. | 244/118.5 |
| 6,994,250 B2 * | 2/2006 | Al Amri | 235/375 |
| 7,027,808 B2 * | 4/2006 | Wesby | 455/419 |

(Continued)

FOREIGN PATENT DOCUMENTS

DE 297 21 959 4/1998

(Continued)

OTHER PUBLICATIONS

UK Search Report for GB 0609891.7, date of search Sep. 15, 2006.

(Continued)

*Primary Examiner*—Timothy D Collins
*Assistant Examiner*—Justin Benedik
(74) *Attorney, Agent, or Firm*—Nixon & Vanderhye P.C.

(57) ABSTRACT

In one embodiment, a method of operating an aircraft having a passenger cabin and a cargo hold, comprises the steps of directing passengers to board the aircraft, directing passengers to deposit their luggage in a luggage deposit location on-board the aircraft, and subsequently taking the deposited luggage from the luggage deposit location and then storing the luggage in the cargo hold of the aircraft. In another embodiment, a method of unloading an aircraft having a cargo hold and a passenger cabin, comprises the steps of transporting items of luggage from the cargo hold to a luggage collection location on-board the aircraft, and directing passengers to collect their luggage from the luggage collection location and to disembark the aircraft is also provided. Information may be gathered with regard to the identity of passengers embarking and disembarking the aircraft. Yet another embodiment relates to an aircraft having a passenger cabin, a cargo hold, and a luggage handling system mounted in the cargo hold. The luggage handling system may comprise a plurality of luggage storage locations located in the cargo hold of the aircraft, a selector for selecting one of the luggage storage locations, and a luggage transporter for transporting luggage from a luggage deposit location, to the selected luggage storage location.

17 Claims, 4 Drawing Sheets

U.S. PATENT DOCUMENTS

2004/0021572 A1* 2/2004 Schoen et al. ............ 340/572.1
2006/0038077 A1 2/2006 Olin et al.

FOREIGN PATENT DOCUMENTS

| DE | 103 38 704 | 3/2005 |
|---|---|---|
| GB | 2 403 205 | 12/2004 |
| WO | 98/38087 | 9/1998 |
| WO | 98/54073 | 12/1998 |
| WO | 03/097454 | 11/2003 |

OTHER PUBLICATIONS

UK Search Report for GB 0609891.7, date of search Apr. 11, 2007.
Ilyushin IL-86 aircraft, "2.1 Multi-Deck Approach" Sep. 2005.

* cited by examiner

AIRCRAFT LUGGAGE HANDLING SYSTEM

RELATED APPLICATIONS

The present application is based on, and claims priority from, UK Patent Application Number 0609891.7, filed May 18, 2006, the disclosure of which is hereby incorporated by reference herein in its entirety.

BACKGROUND OF THE INVENTION

The present invention relates to an aircraft and a luggage handling system. The invention relates in particular, but not exclusively, to an aircraft having an integrated luggage handling system, for example, in the cargo hold of the aircraft, and more particularly to the automation of such a luggage handling system.

Passenger aircraft are equipped to carry luggage belonging to passengers travelling on the aircraft, in addition to other packages being carried as freight. The luggage is generally carried in a cargo hold of the aircraft typically located beneath the floor of the passenger cabin. The cargo hold is typically a separate area of the aircraft, to which, in conventional designs, passengers do not have access.

In the conventional manner of operating aircraft, passengers check-in and deposit their luggage at a check-in desk located in the airport from which they are departing. Luggage is transported from the check-in desks to the required aircraft by airport systems and staff, and then loaded into the cargo hold of the aircraft by luggage handling staff. When an aircraft arrives at a destination the luggage is off-loaded by luggage handling staff and transported to a luggage collection hall, from where passengers can collect their luggage.

Airports have a number of check-in desks and many aircraft may be departing and arriving at any given time. It is therefore necessary to identify each item of luggage and route it between the check-in desk and the correct aircraft. Also, luggage must be routed from the arriving aircraft to an appropriate luggage collection hall. The transport of luggage to and from aircraft may be a complex, expensive, time-consuming and labour intensive task.

In order to avoid the inadvertent carriage of dangerous goods, for example explosive devices, only luggage belonging to passengers who actually board an aircraft can be carried. It is common for passengers not to arrive at their aircraft on time for their flight, but since their luggage may have already been loaded onto the aircraft, the flight cannot depart until either the luggage is off-loaded or the passenger arrives. This can cause significant delays to the departure of the flight, thereby reducing customer satisfaction, and increasing an airlines cost due to schedule disruption.

The present invention seeks to provide an improved system of embarking passengers and luggage onto a passenger aircraft that enables loading of luggage without the need for complex airport systems and/or that removes the possibility of luggage being loaded onto an aircraft without its owner boarding the aircraft.

Alternatively, or additionally, the present invention seeks to provide a luggage handling system and/or a method of operating an aircraft, which mitigate or remove the above-mentioned disadvantages of the prior art methods of operating aircraft.

SUMMARY OF THE INVENTION

The present invention therefore provides, according to a first aspect of the invention, a method of operating an aircraft having a passenger cabin and a cargo hold, comprising the steps of:
directing passengers to board the aircraft,
directing passengers to deposit their luggage in a luggage deposit location on-board the aircraft, and
subsequently taking the deposited luggage from the luggage deposit location and then storing the luggage in the cargo hold of the aircraft.

Thus, in accordance with this aspect of the invention, it is the passengers that ensure that their luggage is taken to the correct aircraft. Therefore, any passenger who is late for a flight will typically not have any luggage stored on-board an aircraft and the aircraft may therefore depart without needing to wait either for the late passenger to arrive or for his/her luggage to be removed from the aircraft. Effecting storage of luggage in the cargo-hold by means of a moving luggage from a luggage deposit location on the aircraft to the cargo hold also facilitates advantageous, but optional, features, which are described in more detail herein.

The step of storing the luggage is preferably performed automatically. The step of storing the luggage may be performed, wholly or in part, by aircraft staff.

The method is preferably applied to the majority of passengers boarding the aircraft and to the majority of the items of luggage to be stored in the cargo hold. The method may be applied to substantially all of the passengers boarding the aircraft and to substantially all of the items of luggage to be stored in the cargo hold. It will be appreciated however that there may be reasons why a small minority of the items of luggage to be stored in the cargo hold can not stored by means of the method of the invention. For example, it will be understood that passengers who cannot transport their luggage to the aircraft may utilise others means to transport their luggage to the aircraft. Also, certain items of luggage may be handled differently. For example, bulky items of luggage or items that are otherwise difficult to handle may be stored in the cargo hold be means of alternative methods. It will also be understood that passengers may in accordance with conventional practice carry hand-luggage into the passenger cabin of the aircraft. The method may be applied to substantially all passengers, in a given class of seat, boarding the aircraft and to substantially all of the items of luggage to be stored in the cargo hold belonging to those passengers. For example, the method could be applied to only certain classes of passengers, such as for example business class passengers and/or first class passengers and/or any passengers in a class other than the lowest classification of passenger (the lowest classification typically being standard or economy class).

Directions may be provided implicitly by the layout of the aircraft, or may be provided by verbal or physical commands given by aircraft staff. Visible directions may also be provided by signing.

The cargo hold may comprise a plurality of luggage storage locations, each luggage storage location being independently accessible. The step of storing the luggage may thus include a step of selecting one of the plurality of storage locations for the storage of luggage. Preferably, at least one item of luggage is stored in a selected storage location that is different from the storage location selected for another item of luggage. The aircraft may comprise a selector for selecting a storage location for the storage of items of luggage. Preferably, all items of luggage stored by means of the method of the invention are stored in storage location(s) selected by the selector.

Luggage storage locations may be specifically equipped sections of the cargo hold, or may be individual areas of the cargo hold set aside for the storage of groups items of luggage, wherein each location holds a sub-set of the total quantity of luggage in the cargo hold. Each storage location may have a volume of less than ten cubic meters, and may have a volume of about one cubic meter or less.

The selector is preferably implemented as an electronic system, for example comprising a computer or microprocessor system. The selector may, alternatively or additionally, comprise a mechanical luggage handling system, which for example directs luggage to a specific storage location, by the use of physical movement of a part of the system.

Each item of luggage may be stored in a storage location selected by the selector. The step of selecting a storage location for the storage of items of luggage may be performed by the selector in respect of each item of luggage to be stored. Thus, the selection of a storage location may be performed separately for each item of luggage.

The storage location may be selected in dependence on the locations in which items of luggage have previously been stored. For example, the storage location may be selected in dependence on the number of items of luggage that have previously been stored in one or more particular luggage storage locations.

A sequence of luggage storage locations may be pre-defined for the storage of successive items of luggage. The storage location in the sequence selected for each item of luggage may for example be defined by the number of items previously stored (for example, the number or volume of items stored in the previous storage location in the sequence). The storage location in the sequence selected for each item of luggage may simply be determined by selecting the next storage location in the sequence when the present storage location in the sequence is deemed to be full of luggage. The sequence may be stored in the selector. The sequence may be executed under the control of an operator. The sequence may be implicit from the arrangement of the storage locations.

Information may be gathered on-board the aircraft to identify each passenger. Preferably the information is gathered by reading information from a passengers boarding card. Information identifying a passenger may be stored on the boarding card in a suitable machine-readable format, for example a bar-code or magnetic stripe. Alternatively, the information may be gathered by biometric identification, or by data entry by aircraft staff or passengers.

The luggage storage location may be selected based on the identifying information gathered on-board the aircraft. For example storage locations may be selected dependent on seating position, or priority of the passenger.

The method may include a step of gathering information to identify each item of luggage to be stored in the cargo hold by means of the method of the invention. The step may for example gather information relating a passenger to his/her item(s) of luggage. The step may be performed on-board the aircraft.

Information regarding the luggage may be entered by aircraft staff, or passengers, or read by a luggage identification system. For example in an embodiment of the invention, identifiers (for example in the form of labels or wireless electronic tags) are applied to items of luggage identifying each item, which labels are read by an electronic reader and then related to information gathered about the identity of the passenger.

The method may also include a step of storing information with regard to the storage location of a passenger's luggage.

The information may be stored in a database on-board the aircraft. That database may be linked to a ground based database to exchange information with check-in systems in the airport.

Each passenger may be assigned a unique identifier to a passenger, enabling that passenger to be related to his/her item(s) of luggage. The identifier may be a unique identifying number, such as a passport number, ticket or boarding card number, the passenger's name, or other identifiers that are used for purposes other than those of the present method. The unique identifier may alternatively be one generated by the present method.

A marker may be applied to the passengers luggage to relate that luggage to its owner. For example, a sticker bearing identifying information may be applied or a wireless electronic tag may be applied.

The method may further include a step of gathering information relating to a characteristic of an item of luggage, such as for example its shape, size and/or weight. The luggage storage location may be selected based on the gathered characteristics of that item of luggage. The storage location may for example be selected on the basis of the size of the luggage, or the number of items related to a given passenger.

Any information gathered by the method of the invention (for example relating to the luggage, passengers and/or locations of storage of the luggage) may be stored, preferably electronically, in a central data storage facility, for example the memory of a computer, onboard the aircraft.

The step of storing the deposited luggage in the cargo hold of the aircraft will typically include a step of moving an item of luggage from the luggage deposit location and transporting it to the location in which it is stored in the cargo hold. Thus, at least one of the locations in which luggage may be stored may be remote from the luggage deposit location. The luggage deposit location may be linked to the cargo hold of the aircraft. A chute or conveyor may be provided to transfer luggage from the deposit location to the cargo hold, if the deposit location is not in the cargo hold. The luggage deposit location is preferably located in the cargo hold of the aircraft. A transporting device, such as a chute, conveyor, carousel or the like, may be provided to assist movement of items of luggage from the luggage deposit location to the location in which they are stored in the cargo hold. The luggage deposit location preferably may include space for the temporary storage of luggage, before it is moved to storage. Such storage space, being sufficient only to hold luggage temporarily will not be large enough to accommodate all luggage of all passengers for an average flight.

The method preferably includes a step of directing passengers to the passenger cabin of the aircraft after they have deposited their luggage in the luggage deposit location. Such a method may be implemented using an aircraft having an upper level and a lower level and a passenger stair system providing access between those levels. The lower level may be separated from the upper level by the floor of the upper level. The stair system may comprise internal passenger stairs to allow passenger access between the lower and upper levels. The internal passenger stairs may be movable between a deployed position and a stowed position. There may be an opening in the floor separating the lower level from the upper level, the stairs being so arranged that, when the internal passenger stairs are in the deployed position, passengers can move between the lower and upper levels via the internal passenger stairs, and when the internal passenger stairs are in the stowed position, the opening in the floor is closed. For example, the method according to certain embodiments of the invention may comprise steps of directing passengers to embark onto the lower level of the aircraft and to deposit their luggage in a luggage deposit location on-board the aircraft, storing luggage deposited in the luggage deposit location in a cargo hold of the aircraft, and directing passengers to move to the upper level via the internal passenger stairs and, an opening between the upper and lower levels (for example, said opening mentioned above). Such a method may also include a step of subsequently moving the internal passenger stairs to a stowed position and closing said opening in the floor.

The method may also include a step of directing disembarking passengers to collect their luggage from a luggage collection location, which is preferably located on-board the aircraft.

The method may further comprise a step of transporting luggage from where it is stored to the luggage collection location. Furthermore, the method may comprise a step of selecting a luggage storage location and transporting the luggage in that luggage storage location to the luggage collection location.

The method may further comprise a step of gathering information to identify a disembarking passenger. The luggage storage location from which luggage is transported to collection location may be selected during disembarkation based on the information identifying a disembarking passenger.

Data stored during embarkation of passengers relating passengers to the storage location of their luggage may be utilised to select a luggage storage location during disembarkation.

Luggage may be returned to the luggage collection location in a predefined order.

Preferably, luggage is returned in an order related to the seating arrangement of passengers. Alternatively, or additionally (in the case where the order of the boarding of passengers relates to their seat location), luggage may be returned in the reverse order to that in which it was stored.

The method may include a step of directing passengers to collect their luggage in an order defined by the order in which the luggage is returned to the luggage collection location.

Accordingly, luggage may be returned to the luggage collection location in a convenient order. Passengers may then be called, as appropriate, to the collection location to collect luggage as it arrives at the collection location. Such a method ensures that passengers only arrive at the collection location when their luggage is available, thereby reducing queues and congestion in the area.

Luggage may of course simply be removed from the aircraft and transported to the airport terminal for collection by some or all of the passengers.

It will be understood from the above, that on arrival at a destination, luggage may be returned to passengers, either at or on the aircraft or elsewhere: (a) without any selection of luggage or passenger by the present invention, (b) in an order determined by the order of disembarkation of the passengers with the items of luggage being retrieved from the cargo hold, on the basis of information previously acquired by the method of the invention, or (c) in an order determined by the order in which luggage arrives at a luggage collection point, the passengers being directed to disembark in substantially the same order as their luggage, on the basis of information previously acquired.

The luggage collection location is preferably at, and more preferably on-board, the aircraft.

The present invention also provides, in accordance with a second aspect of the invention, a method of unloading an aircraft having a cargo hold and a passenger cabin, comprising the steps of transporting items of luggage from the cargo hold to a luggage collection location on-board the aircraft, and directing passengers to collect their luggage from the luggage collection location and to disembark the aircraft.

Such a method saves passengers having to wait in a luggage collection hall for their luggage, and removes the need for passengers to locate their own luggage amongst all of the other luggage off-loaded from an aircraft, as is required in conventional methods of unloading aircraft. Furthermore, there is no need for airport-based luggage handling systems since passengers transport their own luggage from the aircraft.

It will be understood that the unloading of the aircraft effected by means of the present invention need not require the unloading of anything other than passengers and their luggage carried on the aircraft.

The transporting of items of luggage from the cargo hold to the luggage collection location may comprise transporting items of luggage from separate luggage storage locations in the cargo hold.

The method of unloading an aircraft may also comprise a step of transporting items of luggage from the cargo hold to the luggage collection location in a predefined order. The method may also comprise directing passengers to collect their luggage in an order related to the order in which items of luggage are transported to the luggage collection location.

Preferably, the predefined order is dependent on (for example being substantially defined by) the seating location of the owner of each item of luggage. The predefined order may be dependent on the order in which items of luggage were stored (for example being substantially defined by the reverse of that order of storage).

The present invention also provides, in accordance with a third aspect, a method of unloading an aircraft having a cargo hold and a passenger cabin, comprising the steps of directing passengers to disembark the aircraft via a luggage collection location, gathering information about the identity of a passenger (preferably prior to their arrival at the luggage collection location), utilising the information about the identity of a passenger to identify one or more items of luggage related to that passenger, transporting the item(s) of luggage related to the passenger to the luggage collection location, and directing the passenger to collect their item(s) of luggage from the luggage collection location.

Thus, the luggage belonging to each passenger may be delivered to each passenger in a selective and controlled manner, and does not require each passenger to have to search for their luggage from a large collection of other luggage as is conventionally the case.

The information gathered may be, for example, the name, seat number or an identifying code assigned during embarkation.

The step of gathering information about the identity of a passenger may be performed by reading information from a boarding card of that passenger.

Such a method is convenient since all passengers are issued with a machine readable boarding card prior to boarding the aircraft, and that boarding card contains sufficient information for use in the present invention.

In accordance with a fourth aspect of the invention, there is also provided a method of unloading an aircraft, having a cargo hold and a passenger cabin, comprising a repetition of the steps of transporting an item of luggage from the cargo hold to a luggage collection location, selecting a passenger based on the item of luggage transported to the luggage collection location, and directing the selected passenger to collect their item of luggage from the luggage collection location.

In the third and fourth aspects of the invention it will be noted that the luggage collection location need not be located at or on the aircraft. In the case where the luggage collection location is onboard the aircraft the method of either aspect of the invention may include a step of directing the passengers to disembark from the aircraft after having collected their luggage.

According to a fifth aspect, the present invention also provides an aircraft having a passenger cabin, a cargo hold, and a luggage handling system mounted in the cargo hold, the luggage handling system comprising:

a plurality of luggage storage locations located in the cargo hold of the aircraft, a selector for selecting one of the luggage storage locations, and a luggage transporter for transporting luggage from a luggage deposit location, to the selected luggage storage location. Thus, the aircraft comprises an on-board luggage handling system that may be used to effect storage of items of luggage, deposited at the luggage deposit location, in one or more luggage storage locations onboard the aircraft.

Luggage storage locations may be defined by structural features of the cargo hold, or may be individual (notionally divided) areas of the cargo hold set aside for the storage of groups items of luggage. Each location may hold only a small sub-set of the total quantity of luggage in the cargo hold. Each luggage storage location may be associated with separate storage equipment.

The luggage transporter may also transport luggage from a selected one of the luggage storage locations to a luggage collection location.

Such a feature allows passengers to collect their own luggage as they disembark from the aircraft.

The luggage handling system may comprise an on-board luggage tracking system. The selector may select a luggage storage location based upon an input to the on-board luggage tracking system.

The luggage tracking system may be implemented as an electronic system, for example a microprocessor or computer, suitably programmed. The luggage tracking system may include a boarding card reader, which reader may be mounted at an entrance to the aircraft. The aircraft may be so arranged that there is an entrance to the cargo hold from the passenger cabin. Such an entrance may for example be of a size enabling luggage (and possibly passengers) to pass therethrough. In the case where there is provided such an entrance, the boarding card reader may be located at the entrance.

The aircraft may also comprise a luggage storage device comprising a plurality of independently accessible luggage storage locations. Such a device allows efficient use to be made of the cargo hold space whilst allowing independent access to items of luggage stored in each luggage storage location. The luggage storage device may comprise a plurality of moveably mounted luggage storage supports, each support corresponding to an independently accessible luggage storage location.

The transporter may comprise luggage conveyors. For example, the transporter may comprise a main conveyor and a plurality of storage conveyors, each storage conveyor being configured to accept luggage from the main conveyor and deposit it in a luggage storage location corresponding to that storage conveyor. The main conveyor may comprise a plurality of powered rollers. The powered rollers may be individually controllable to allow the independent, simultaneous, transport of a plurality of items of luggage. Such a conveyor system may speed up the handling of luggage by permitting the transport of many independent items simultaneously.

The luggage collection location may be located in the same region of the aircraft as the luggage deposit location. The luggage collection location may be the same as the luggage deposit location. The luggage collection location may in the cargo hold of the aircraft.

A passenger-accessible part of the cargo hold may have a height sufficient for a person to stand.

Such a cargo hold may be implemented using an aircraft as disclosed GB Application No GB0609890.9 filed on 18 May 2006 entitled "Aircraft With Improved Cargo Hold", Airbus UK Limited ref: XA2218. The contents of that application are fully incorporated herein by reference. In particular, the claims of the present application may be amended to include any of the features disclosed in that application. For example, the aircraft may comprise a fuselage which houses an upper level and a lower level separated by the floor of the upper level, wherein at least one of the cross-sectional shape of the fuselage and the floor of the upper level is configured such that the ceiling height in at least part of both the upper and lower levels is sufficient for a person to stand, and one of the upper and lower levels comprises a passenger cabin and the other level comprises a cargo hold.

Certain embodiments of the present invention may be of particular benefit in the form of or in relation to relatively small aircraft, particularly those for short-haul flights The aircraft may be of a size equivalent to an aircraft designed to carry no more than 300 passengers, and more preferably no more than 250 passengers, and yet more preferably no more than 220 passengers. The aircraft may be of a size equivalent to an aircraft designed to carry no more than 150 passengers. The aircraft may be of a size equivalent to an aircraft designed to carry more than 10 passengers, and more preferably more than 30 passengers. The aircraft may be lighter than 200 tonnes dry weight, and more preferably lighter than 100 tonnes dry weight.

It will be appreciated the various aspects of the invention as described herein are closely related and that therefore features of one aspect of the invention may be incorporated into other aspects of the invention as described herein. Thus, for example, in view of the statements herein that the method of (the first aspect of) the invention may be performed in respect of the majority of (and substantially all of) the passengers embarking the aircraft and/or to the majority of (and substantially all of) the items of luggage to be stored in the cargo hold, it will be appreciated that any of the second to fourth aspects of the invention may be performed in respect of the majority of (and substantially all of) the passengers disembarking from the aircraft and/or to the majority of (and substantially all of) the items of luggage to be retrieved from the cargo hold. Also, any aspect of the method of the invention may use, or be performed on, an aircraft according to any other aspect of the invention. Similarly, the aircraft according to any aspect of the invention may be so configured as to be suitable for use in a method according to any other aspect of the invention. Features of the apparatus of the invention may be incorporated into the method of the invention and vice versa.

DESCRIPTION OF THE DRAWINGS

Embodiments of the present invention will now be described by way of example with reference to the accompanying drawings, of which.

DETAILED DESCRIPTION

The first embodiment of the invention provides an automatic luggage handling system mounted in an aircraft's cargo hold.

Figure 1:
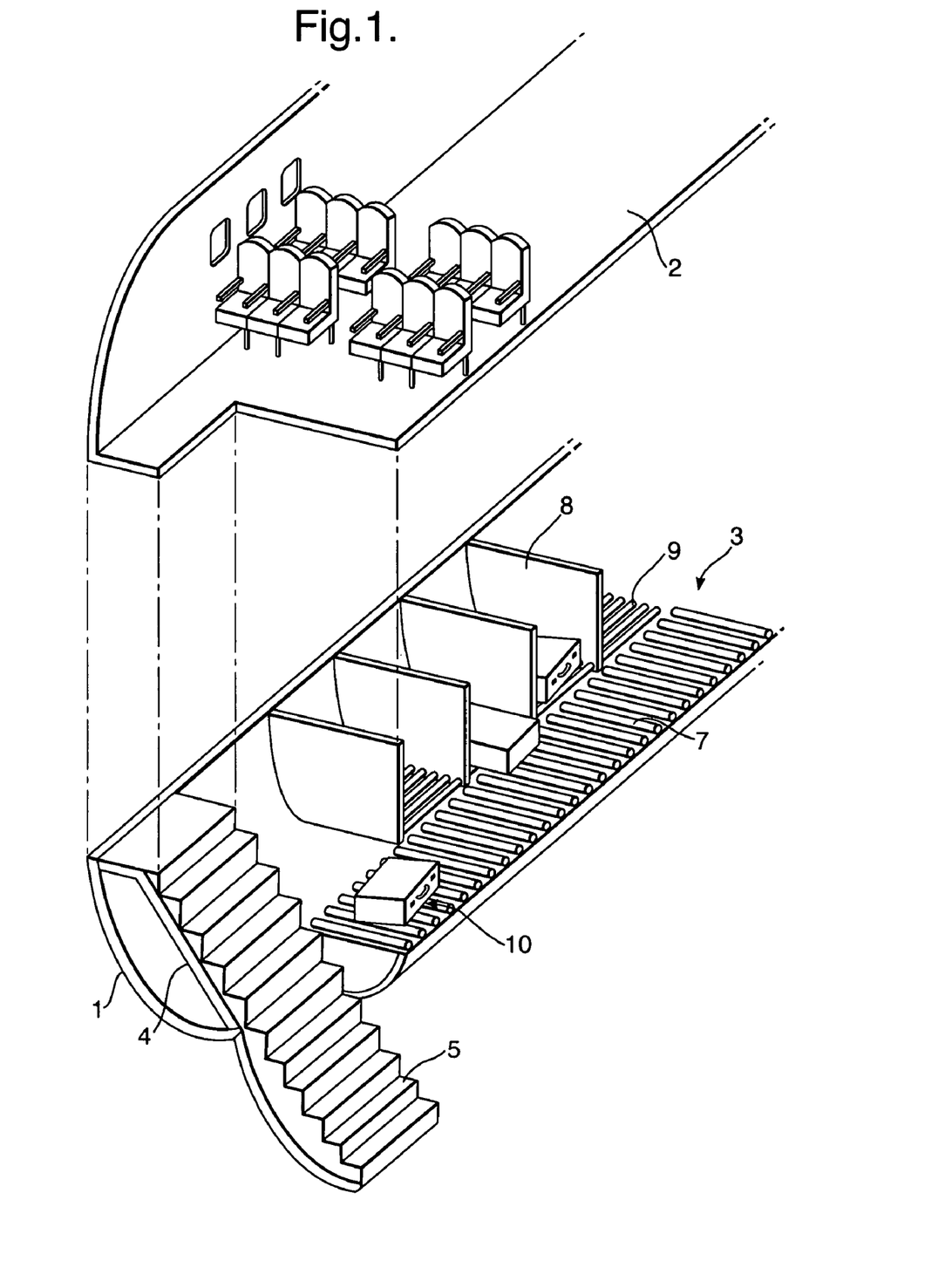
FIG. 1 shows an aircraft according to a first embodiment of the invention.

FIG. 1 is a cutaway perspective diagram of an aircraft according to a first embodiment of the invention. The aircraft fuselage 1 encloses two levels—a first, lower, cargo hold 3, and a second, upper, passenger cabin 2. A first set of retractable stairs 4 provides passenger access between the cargo hold 3 and the passenger cabin 2. A second set of retractable stairs 5 provides passenger access between the ground and the cargo hold 3. Cargo hold 3 is equipped with a luggage handling system for handling and storing luggage during flight.

The luggage handling system comprises a main conveyor 7 for transporting luggage along the hold 3, and a plurality of luggage storage locations 8 for storing luggage. Luggage storage locations 8 are provided with storage location conveyors 9 to transport luggage from the main conveyor 7 into, and out of, the storage locations 8. Conveyors 7, 9 are controlled by an electronic controller which forms part of the luggage handling system.

When loading an aircraft according to the first embodiment of the invention, passengers carry their luggage to the aircraft as opposed to checking it in at an airport check-in desk. Embarking passengers enter the aircraft via the second set of stairs 5, which bring them to the cargo hold 3. The passengers deposit their luggage on the main conveyor 7 at deposit/collection location 10. The controller sequentially selects an appropriate storage location and controls the conveyor system 7, 9 to transport the luggage to the selected luggage storage location 8. The passengers then continue up the first set of stairs 4 to the passenger cabin 2 to take their seats. When disembarking the aircraft the controller selects luggage storage locations and controls the conveyors 7, 9 to transport the luggage to the deposit/collection location 10, such that the passenger can collect their luggage and disembark via the stairs 5. Since passengers transport their own luggage to the aircraft, there is no need for the provision of luggage handling and transport facilities at the airport. Furthermore, all luggage that is loaded onto an aircraft must belong to a passenger on the aircraft, thereby reducing the possibilities of delays due to passengers not arriving on time and staff having to off-load their luggage.

Figure 2:
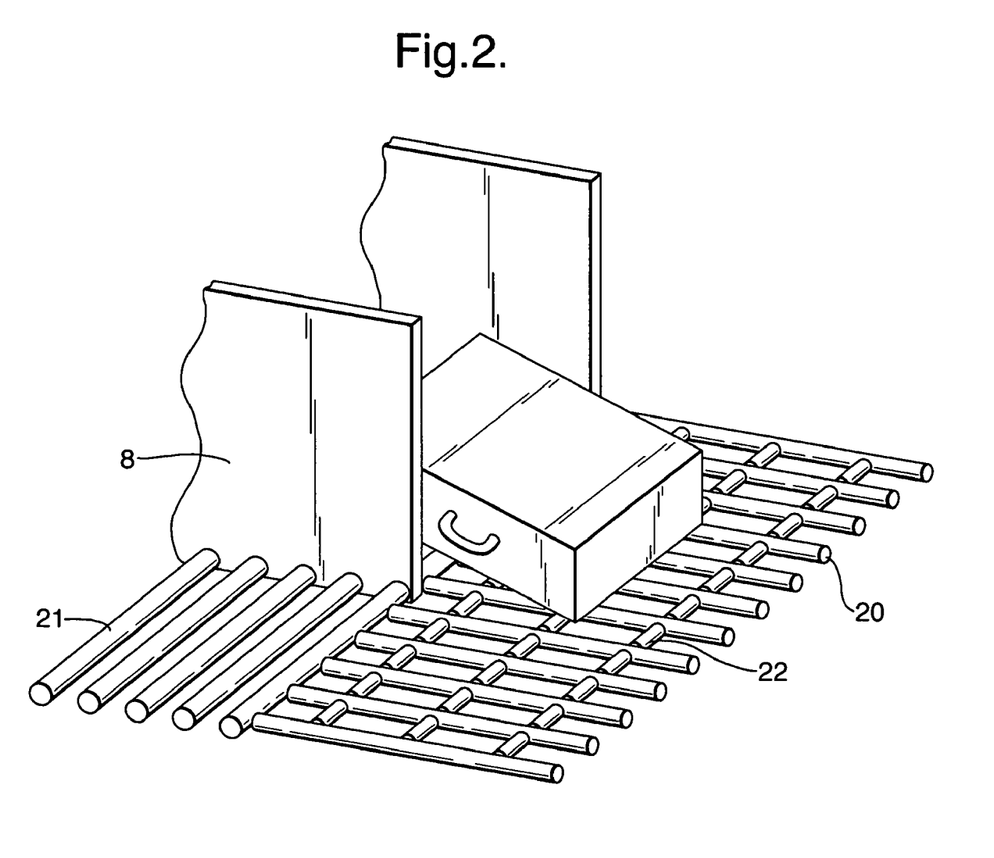
FIG. 2 shows a detailed section of a luggage handling system according to an embodiment of the invention.

FIG. 2 shows a more detailed view of the conveyor system of the first embodiment of the invention. The conveyors 7, 9 are constructed of a plurality of powered rollers 20 and luggage is moved by the rotation of the rollers underneath the luggage. Luggage storage conveyor 21, which is one of a plurality of similar such conveyors 9 shown in FIG. 1, extends from within the luggage storage location 8, through the main conveyor 7. Partial rollers 22 of the luggage storage conveyor 21 are spaced between the rollers 20 of the main conveyor 7. The positioning of the partial rollers 22 in the main conveyor 7 allows luggage to be transported along the main conveyor 7 past storage locations 8, and also to be transported into a selected luggage storage location by the activation of the appropriate luggage storage conveyor. Luggage is transported along conveyor 7 until it is adjacent to the required luggage storage location. The partial rollers 22 of the appropriate luggage storage conveyor 20 are then activated to move it into a storage location 8.

The rollers forming the conveyors are independently controllable, such that a plurality of items of luggage can be simultaneously, and independently, moved by that conveyor. The controller controls the conveyors 7, 9 such that each item of luggage is moved and stored in the required storage location.

The controller may be constructed in accordance with methods known in the art of parcel sorting machinery design and manufacture. For example, a microcontroller or pre-programmed computer system may be used. The controller controls the conveyors such that each item of luggage is stored in the first available storage location. During disembarkation the controller controls the conveyors such that each item of luggage is returned to the deposit/collection location 10 in the reverse order to which it was loaded. It is therefore beneficial, but not necessarily essential, for the passengers to disembark the aircraft in the correct order to collect their luggage. A luggage collection area may be provided to which luggage is returned from the storage locations, from where passengers can then collect their luggage, thereby allowing passengers to disembark in any order.

Figure 3:
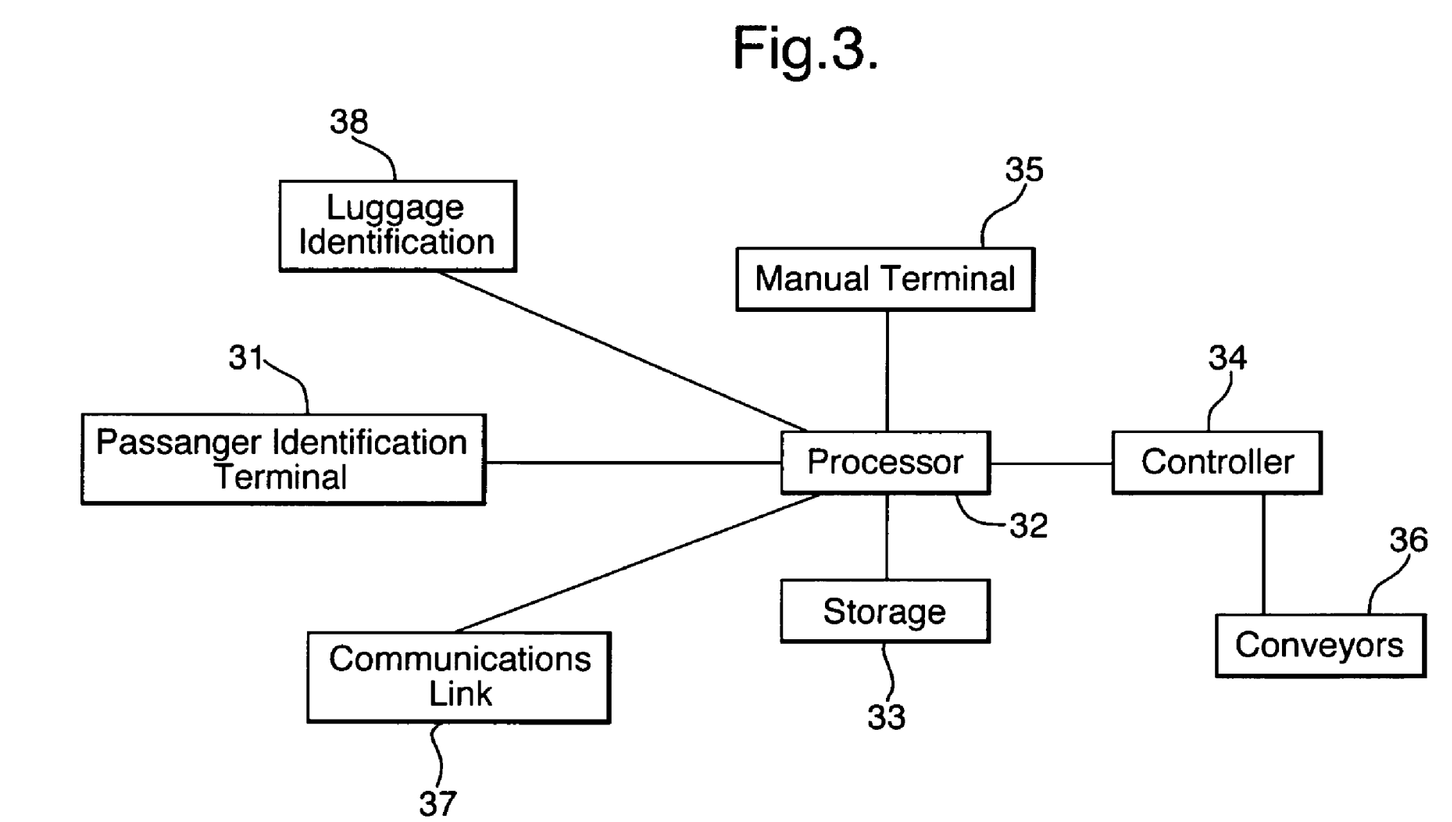
FIG. 3 is a schematic diagram of a luggage tracking and storage system according to a second embodiment of the invention.

FIG. 3 shows a schematic diagram of a luggage tracking and storage system according to a second embodiment of the invention.

When passengers check-in for a flight they are issued with a boarding pass containing both text and machine readable representations which enable retrieval of the passenger name and flight details. Such passes are used to provide access to the correct aircraft.

The system of FIG. 3 comprises at least one passenger identification terminal 31 located on the aircraft for reading the boarding cards of passengers embarking and disembarking the aircraft. That terminal is linked to a processor 32, having storage area 33, for processing and storing data with regard to passengers and their luggage. The processor is linked to the controller 34 of the first embodiment such that luggage can be moved by the conveyors 36 to and from storage locations under the control of the processor 32. A manual interface 35 is also provided to allow manual control of the conveyors or manual selection of passengers and/or luggage. The processor may also be linked 37 to ground-based systems to exchange data with regard to the passengers expected to board the aircraft and those that actually have boarded the aircraft.

In the second embodiment of the invention, the passenger identification terminal 31 is a boarding card reader capable of reading the identification of a passenger from a boarding card presented to it. For example, the reader may be a bar code reader or magnetic stripe reader, as is well-known in the art.

Passengers embarking on to an aircraft equipped with a system according to the second embodiment of the invention present their boarding card to a reader 31 located at the entrance to the aircraft. The passenger then places their luggage at the luggage deposit/collection location 10 and it is moved to a storage location as described with reference to the first embodiment of the invention. The luggage tracking system associates the storage location 8 in which the item of luggage is stored with the passenger details that have been read by the boarding card reader and records that in the storage area 33. The luggage tracking system therefore has a complete record of the storage location of all of the passengers' luggage.

When disembarking from the aircraft the passengers present their boarding cards to a reader at the top of the internal stairs 4 before descending to the cargo hold 3. The luggage tracking system identifies the storage location of that passenger's luggage using the data stored during embarkation and the conveyor system removes that luggage from the storage location and returns it to the luggage deposit/collection location 10 from where the passenger can collect it upon descending to the cargo hold 3. Each passengers' luggage is therefore presented as they pass through the hold when leaving the aircraft, removing the need to await its delivery to a luggage collection hall in the airport.

Figure 4:
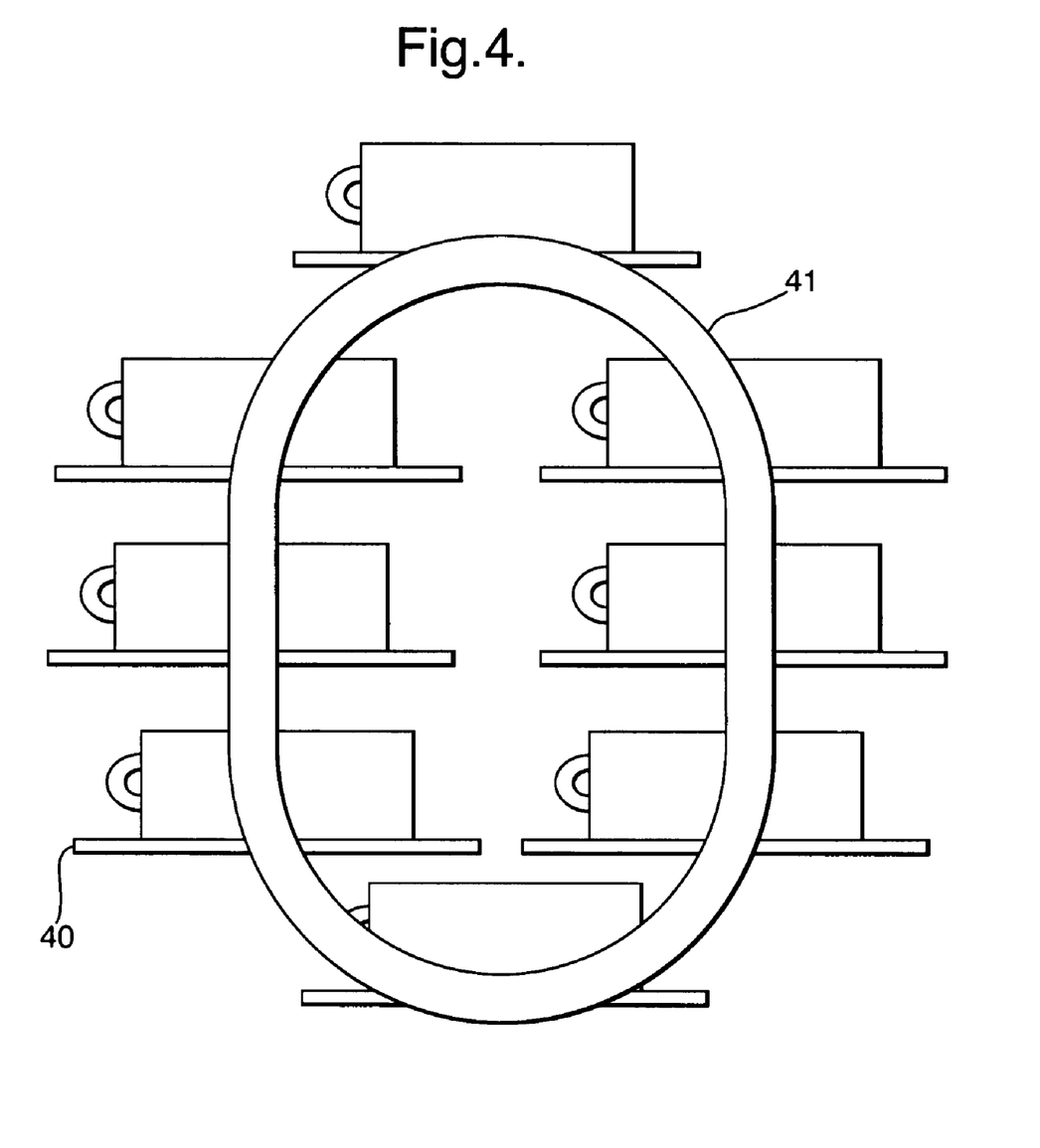
FIG. 4 shows a luggage storage device for holding a plurality of independent items of luggage.

FIG. 4 shows an example of a luggage storage device, for use in a luggage storage location of the first embodiment of the invention, capable of storing a plurality of independent items of luggage. In the first embodiment of the invention only one item of luggage (or a group of jointly accessible items) can be stored in each storage location, thereby restricting the number of independent items of luggage that can be stored in a given cargo hold.

A plurality of luggage supports 40 are moveably mounted on a track 41 such that the supports 40 can be moved around the track while remaining horizontal. The apparatus is mounted such that the support in the lowest position aligns with a luggage storage conveyor 9 such that luggage can be positioned on, and removed from, that support. When a piece of luggage has been stored in the lowest support, the supports are rotated to move another, vacant, support to that location, ready to accept an item of luggage. In the example shown in FIG. 4, up to 8 items of luggage can be stored in a relatively compact space. Furthermore, each item of luggage can be independently retrieved. The supports are constructed of conveyors to load luggage onto each support from the respective storage conveyor.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

In the first embodiment of the invention the conveyor 7 terminates close to the stairs 5 in a luggage deposit/collection location 10 such that passengers can deposit, and collect, their luggage on/from the conveyor. Alternatively, a luggage deposit and collection area may be provided to enable passengers to facilitate that deposit and collection. For example, an area may be provided for passengers to deposit their luggage, from where staff can place it onto the conveyor system. This avoids the need for passengers to ensure luggage is correctly positioned on the conveyor system.

The deposit/collection location may not be located in the cargo hold, but may be in the passenger cabin. The methods of the first and second embodiments of the invention may thus be implemented in conventional aircraft in which passengers do not have access to the cargo hold. When utilising a conventional aircraft in the method of either embodiment, passengers embark into the passenger cabin of the aircraft and deposit their luggage in a deposit location in the passenger cabin, from where luggage is transported to the cargo hold for storage. That transport may be via a chute or conveyor added to the aircraft, or may be by aircraft staff. A luggage transport and tracking system according to the first and second embodiments of the invention may be mounted in the cargo hold of a conventional aircraft to transport and store passengers' luggage.

In an alternative arrangement, the luggage storage locations consist of containers that can store a plurality of items of luggage. During loading, a plurality of items of luggage are stored in each container. Upon arrival and disembarkation, the containers are off-loaded by luggage handling staff and transported to a luggage collection hall in the airport for collection by the passengers. Such a process may decrease the disembarkation time, thereby reducing the time until the aircraft is available to depart. Furthermore, a similar system may be implemented without the use of containers.

It will be apparent to the reader that other forms of conveying system could also be utilised instead of the rollers of the first embodiment of the invention. For example, belt type conveyors could be utilised, with suitable arrangements provided to move the luggage into the storage locations 8. Furthermore, the conveyors may include moveable storage trays into which luggage is deposited. Such trays may improve the performance of the system by enabling the conveyor system to move uneven or awkwardly shaped luggage which may not be handled effectively directly by the conveyor. The supports of the luggage storage device described with reference to FIG. 4 may be configured to engage with such luggage trays.

The height of the cargo hold may be sufficient to allow a person to stand in the hold. The provision of such a hold improves the comfort with which the passengers can deposit and collect luggage in the hold.

Passengers may also be provided with access to the hold, and hence to their luggage, during a flight. Luggage may retrieved and presented to passengers by the methods described above with reference to disembarkation, and is then returned to the relevant storage location for the remainder of the flight.

In the foregoing description the conveyor system is an automated system that routes and stores the luggage. Alternatively, or additionally, a manual interface may be provided such that the conveyors can be controlled by staff to store or retrieve luggage as required. The partial rollers 22 of the conveyor system may be located at the same height as those of conveyor 7, such that both conveyors can act on luggage in the region of the overlap depending upon which conveyor is activated, or alternatively, the height of one or both of the conveyors may be adjustable to govern which conveyor acts on the luggage.

In an alternative to the boarding card readers of the second embodiment of the invention, a biometric identification system, such as a finger print or facial feature recognition system, may be utilised to identify passengers. The passengers may alternatively carry a wirelessly readable device that identifies the passenger. Such a wirelessly readable device may be integrated into an electronic boarding pass card. The identification of passengers when disembarking may thus be effected simply by means of passengers passing a wireless reader prior to arriving at the luggage collection location. Thus, the step of passengers presenting their boarding cards to a reader at the top of the internal stairs as described with reference to the second embodiment may be performed passively by the passengers by means of their simply passing the reader, and the reader wirelessly "reading" their electronic boarding passes.

In a further alternative, each passenger may be assigned a unique identification number. The number may be assigned when obtaining their ticket, during check-in or when boarding the aircraft and may be utilised to identify passengers and to track luggage belonging to each passenger. In further alternative methods of relating luggage to passengers, staff may enter an identifying code for each item of luggage as it is placed on the conveyor, or a token may be given to each passenger. When disembarking the aircraft the code or token may be utilised to retrieve the correct luggage.

A luggage identification device 38 may be provided in the system of the second embodiment of the invention to identify items of luggage being handled by the luggage handling system. Machine readable labels may be applied by aircraft staff such that items of luggage can be tracked in the luggage handling system, or the luggage identification device may apply such labels. The labels may be read by readers located in the luggage handling system, as is well known in the art.

In a luggage storage system including the tracking system of the second embodiment of the invention, luggage may be stored in the first available storage location, as described in relation to the first embodiment of the invention. Alternatively, luggage may be stored according to a pre-defined mapping system, for example mapping seat position to luggage storage location. Such a mapping may improve the efficiency of the disembarkation process by storing the luggage of passengers likely to be the first to disembark in a position from where it can be rapidly retrieved. Such a mapping is calculated and tracked by the processor 32 and data storage 33 which have been pre-programmed with details of the mapping arrangement to be utilised. Furthermore, the storage locations may be of varying size and items of luggage may be stored according to their size, or items of luggage belonging to passengers with priority may be stored in locations from which they can be quickly retrieved such that those passengers can disembark rapidly.

In an alternative method of returning luggage to passengers during disembarkation, a luggage storage location may be selected by the controller and that luggage transported to the luggage collection location. The passenger associated with that luggage is then called to the collection location to collect their luggage and disembark from the aircraft. Luggage storage locations may be selected according to the seating layout of the aircraft to ensure an orderly disembarkation process, or may be selected depending on other factors such as passengers having priority. Passengers may be called to collect their luggage by their names, a unique number assigned to them or by their seating location. The calling may be performed by aircraft staff in response to output from the processor, or may be performed automatically by the processor, for example by the playing of pre-recorded voice messages, or the use of on-board display devices.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of operating an aircraft having a passenger cabin and a cargo hold, comprising the steps of:
   directing passengers to board the aircraft with their luggage,
   directing passengers to deposit said luggage in a luggage deposit location on-board the aircraft, and
   subsequently transporting the deposited luggage from the luggage deposit location and then storing the luggage in the cargo hold of the aircraft.

2. A method of operating an aircraft according to claim 1, wherein
   the cargo hold comprises a plurality of luggage storage locations, each luggage storage location being independently accessible, and
   the step of storing the luggage includes selecting one of the plurality of luggage storage locations such that at least one item of luggage is stored in a selected luggage storage location that is different from the luggage storage location selected for another item of luggage.

3. A method of operating an aircraft according to claim 2, wherein
   the aircraft comprises a luggage storage location selector, and a step of selecting a luggage storage location for the storage of items of luggage is performed by the selector.

4. A method of operating an aircraft according to claim 2, further comprising steps of
   gathering information on-board the aircraft to identify each passenger, and
   using such information to select a luggage storage location for an item of luggage.

5. A method of operating an aircraft according to claim 4, further comprising a step of
   gathering information relating a passenger to his/her item (s) of luggage.

6. A method of operating an aircraft according to claim 2, further comprising steps of
   gathering information relating to a characteristic of the luggage, and
   using such information to select a luggage storage location for an item of luggage.

7. A method of operating an aircraft according to claim 2, further comprising steps of
   directing disembarking passengers to collect their luggage from a luggage collection location on-board the aircraft, and
   selecting a luggage storage location and transporting the luggage in that luggage storage location to the luggage collection location.

8. A method of operating an aircraft according to claim 7, further comprising steps of
   gathering information to identify a disembarking passenger, and
   using such information in the step of selecting the luggage storage location from which the luggage therein is transported to the luggage collection location.

9. A method of operating an aircraft according to claim 1, further comprising a step of
   directing passengers to the passenger cabin of the aircraft after they have deposited their luggage in the luggage deposit location.

10. A method of operating an aircraft according to claim 1, further comprising steps of
    directing disembarking passengers to collect their luggage from a luggage collection location on-board the aircraft, and
    transporting luggage from the cargo hold to the luggage collection location in a predefined order.

11. A method of operating an aircraft according to claim 1, further comprising steps of
    transporting luggage from the cargo hold to a luggage collection location on-board the aircraft, and directing passengers to collect their luggage in an order defined by the order in which the luggage is returned to the luggage collection location.

12. A method of unloading an aircraft having a cargo hold and a passenger cabin, comprising the steps of
transporting items of luggage from the cargo hold to a luggage collection location on-board the aircraft, and
directing passengers to collect their luggage from the luggage collection location and then disembark the aircraft with said luggage.

13. A method of unloading an aircraft according to claim 12, further comprising the steps of
transporting items of luggage from the cargo hold to the luggage collection location in a predefined order, and
directing passengers to collect their luggage in an order related to the order in which items of luggage are transported to the luggage collection location.

14. A method of unloading an aircraft according to claim 13, wherein the predefined order is dependent on the order in which items of luggage were stored.

15. A method of unloading an aircraft according to claim 13, wherein the predefined order is dependent on the seating location of the owner of each item of luggage.

16. A method of unloading an aircraft having a cargo hold and a passenger cabin, comprising the steps of
directing passengers to disembark the aircraft via a luggage collection location,
gathering information about the identity of a passenger,
utilizing the information gathered about the identity of a passenger to identify one or more items of luggage related to that passenger,
transporting the item(s) of luggage related to the passenger to the luggage collection location, and
directing the passenger to collect their item(s) of luggage from the luggage collection location and then disembark the aircraft.

17. A method of unloading an aircraft having a cargo hold and a passenger cabin, comprising a repetition of the steps of
transporting an item of luggage from the cargo hold to a luggage collection location,
selecting a passenger based on the item of luggage transported to the luggage collection location, and
directing the selected passenger to collect their item of luggage from the luggage collection location and depart the aircraft.

* * * * *